March 19, 1935. W. G. CAMPBELL 1,994,751
BRAKE TESTING APPARATUS
Filed March 21, 1932 2 Sheets-Sheet 1
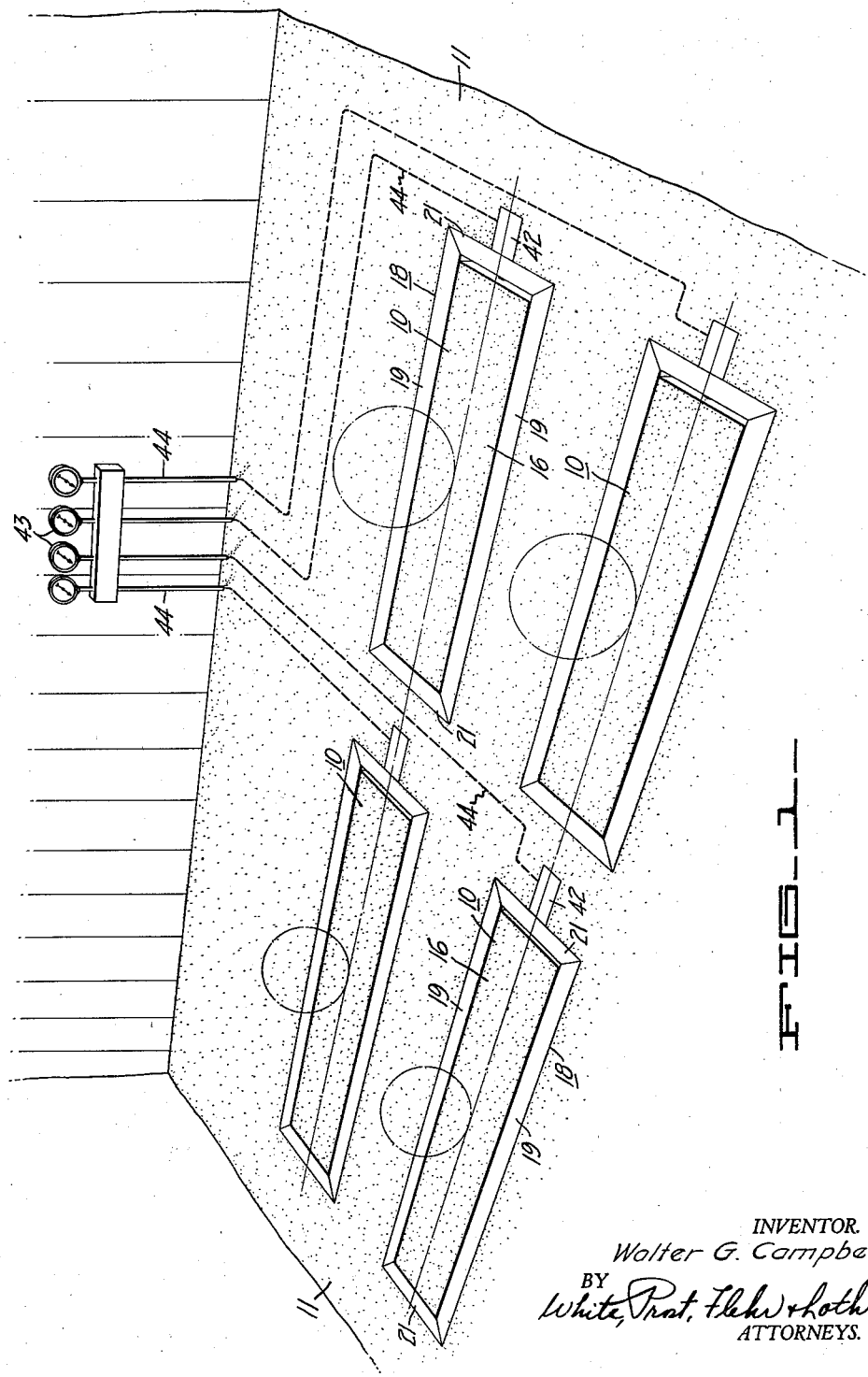
INVENTOR.
Walter G. Campbell
BY
ATTORNEYS.

March 19, 1935.      W. G. CAMPBELL      1,994,751
BRAKE TESTING APPARATUS
Filed March 21, 1932      2 Sheets-Sheet 2
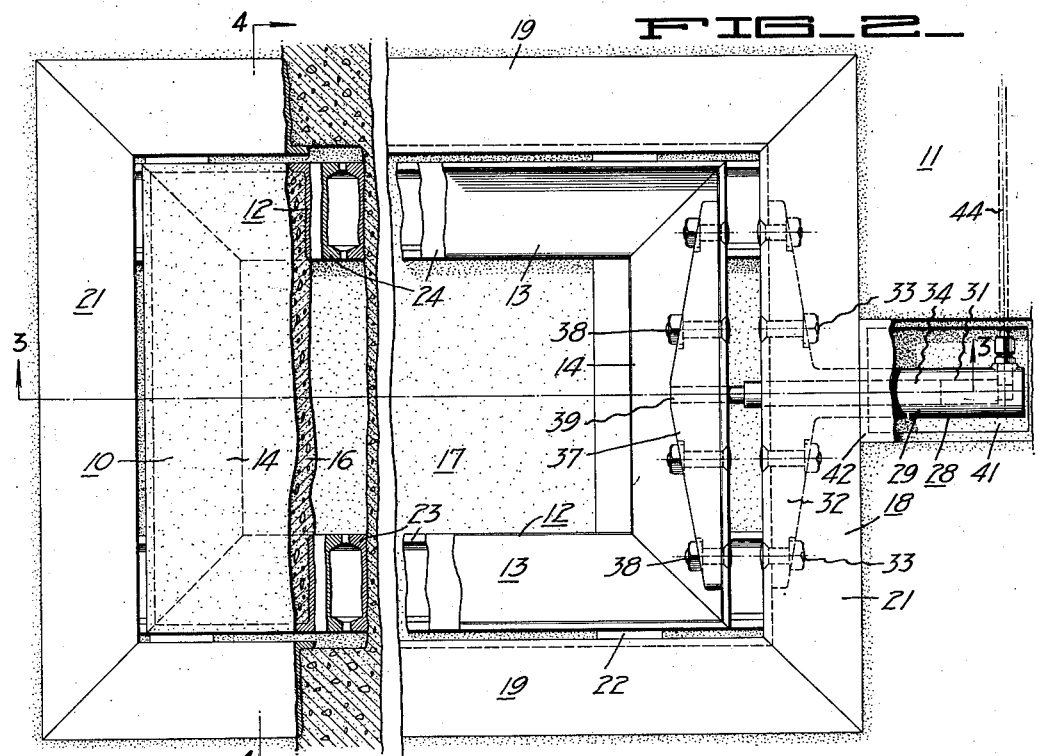
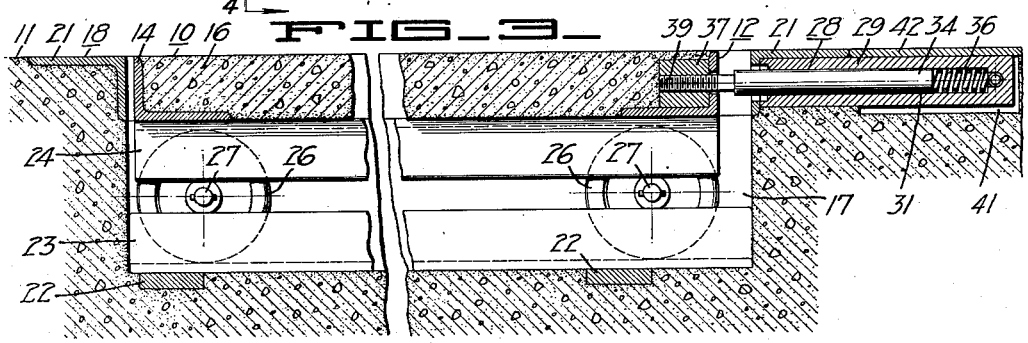
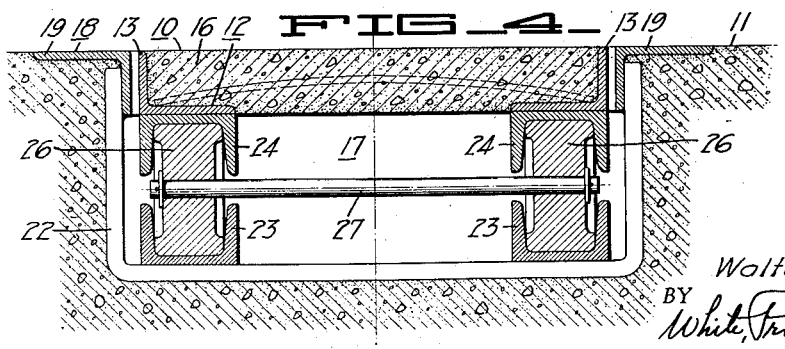
INVENTOR.
Walter G. Campbell
BY
ATTORNEYS.

Patented Mar. 19, 1935

1,994,751

UNITED STATES PATENT OFFICE 1,994,751

BRAKE TESTING APPARATUS

Walter G. Campbell, San Francisco, Calif.

Application March 21, 1932, Serial No. 600,214

1 Claim. (Cl. 265—47)

This invention relates generally to apparatus for testing the brakes of motor vehicles, such as are useful in garages and service stations.

It is a general object of the invention to provide an apparatus of the above character which will give simultaneous comparative indications of the effective braking action on the different wheels of a vehicle, and thus facilitate making general brake adjustments.

It is a further object of the invention to provide a brake testing apparatus which will not reduce the available floor space of a garage or service station in which it is installed, and which can be manufactured and installed at a minimum of cost.

Another object of the invention is to provide an improved brake testing apparatus which will require a minimum of time to complete a testing operation, and which can be utilized by relatively unskilled operators.

Further objects of the invention will appear from the following description in which the preferred embodiment of the invention has been set forth in detail in conjunction with the accompanying drawings. It is to be understood that the appended claim is to be accorded a range of equivalents consistent with the state of the prior art.

Referring to the drawings:

Figure 1 is a perspective view, illustrating a brake testing installation in accordance with the present invention.

Figure 2 is a plan view of one of the tables with its associated parts, certain parts being in cross section, and other parts being broken away to illustrate details.

Figure 3 is a cross sectional detail, taken along the line 3—3 of Figure 2.

Figure 4 is a cross sectional detail taken along the line 4—4 of Figure 2.

As distinguished from prior apparatus utilized for testing the brakes of motor vehicles, my invention is characterized by the fact that a test is made while the vehicle is in motion, and while it is being decelerated by application of the brakes. It is also characterized by the absence of tread mills or other complicated moving parts, which are not only expensive and unreliable, but which also require the services of a skilled operator.

That form of the invention illustrated in the drawings consists of a plurality of tables 10 having their upper surfaces disposed flush or contiguous with the surface of a floor or runway 11. Four of these tables have been illustrated, to enable the testing of vehicles having present-day four wheel brakes. The longitudinal distance between the centers of tables 10 corresponds generally to the distance between the axles of the class of vehicles to be tested. Likewise the lateral distance between the centers of the tables corresponds generally to the gauge or lateral distance between the wheels of the vehicles. While the tables may be variously proportioned, they are preferably rectangular, having their longest dimensions extending in the general direction of movement of vehicles over the same.

A suitable detail for one of the tables 10, and its associated parts, is illustrated in Figures 2 to 4 inclusive. In this case the table itself includes a suitable steel frame 12 formed for example of side and end structural steel angles 13 and 14 which are connected together as by means of welding. The body 16 of the table is formed of a concrete slab, having suitable steel reinforcements.

Table 10 has been shown accommodated within a well 17, formed within the floor 11. Supported by the floor, and bordering the upper edge of well 17, there is a rigid frame 18, constructed, for example, of side and end members 19 and 21, in the form of structural steel angles having their ends secured together as by welding.

To provide means for supporting table 10 with respect to the outer frame 18, I provide means including a plurality of hangers 22 which are secured to the side members of frame 18. Mounted upon hangers 22 are the parallel channels 23, and these channels are positioned below a similar pair of parallel channels 24 mounted upon the under side of table 10. The peripheries of rollers 26 are engaged by channels 23 to 24, so that the table 10 is supported for longitudinal movement. Corresponding pairs of rollers 26 can be connected together by axles 27.

In order to secure an indication of horizontal thrust applied to each table 10 by the wheel of a vehicle passing over the same, I provide means in the form of a liquid pressure unit 28, associated with each table. While these units may be variously formed, the construction illustrated, which is relatively simple and which gives good results, consists of a casting 29 or block provided with a cylindrical bore 31. Casting 29 is provided with laterally extending portions 32, which can be secured to one end of frame 18, as by means of bolts 33. Fitted within cylinder bore 31, there is a plunger 34, which is normally maintained in a retracted position by compression spring 36.

To connect the external end of plunger 34 with table 10, I have shown a reinforcing casting 37 or body, secured to one of the end structural angles 14, as by means of bolts 38, and with which the external end of plunger 34 has a threaded connection 39. The protruding portion of casting 29 can be conveniently received within a well 41, formed in the floor, and which can be normally covered by plate 42.

Referring again to Figure 1, at some suitable location, as for example along the side wall of the building adjacent tables 10, I provide a plurality of fluid pressure indicators 43, there being one indicator for each of the tables 10. These indicators are connected to the fluid pressure units 28 by pipes 44. Indicators 43 can be common fluid pressure gauges, provided with means to indicate a maximum pressure, which can be manually reset to zero. When the apparatus is in normal operation, pipes 44, as well as the bores 31 of the fluid pressure units, are filled with a suitable inelastic liquid, such as glycerine or oil.

To explain the manner in which the apparatus is used in the testing of brakes, it will be presumed that an automobile is driven upon the tables, in the direction from left to right as viewed in Figure 1. Application of the brakes, while all four wheels are resting upon the tables, causes a horizontal thrust to be applied in a forward direction upon each table. Slight forward movement of each table results, to cause inward movement of each plunger 34, to compress the liquid in bores 31 and pipes 44. The extent of this liquid pressure is substantially directly proportional to the horizontal thrust upon the table, and can be readily determined by reading the indicators 43. If the brakes are not properly equalized, it is evident that the thrust upon the tables will not be equal, and the unequal indications obtained will immediately reveal this condition. If the brakes are properly adjusted and equalized, the readings of all of the indicators will be substantially the same.

From the above it is apparent that my apparatus has many advantageous features not found in prior apparatus for testing brakes. A relatively short time interval is required to complete a test. In fact, the vehicle need not be brought to complete rest upon the tables, but may continue off the tables after being decelerated. While a certain amount of floor space is occupied by the tables, these tables offer no obstruction and the floor space can be utilized for other purposes. Furthermore, the test is reliable and accurate, for the reason that it is made under substantially the same as normal road conditions.

The simplicity of my apparatus will also be apparent. It can be manufactured and installed at a minimum of cost, and requires a minimum of servicing to maintain in proper condition.

It will be apparent that my apparatus can be employed for purposes other than for testing brakes. For example it can be employed to determine starting effort, stopping distance, tire tread grip, the grip afforded by different road materials, or other similar tests in which the horizontal thrust applied to the tables is an indication of certain conditions.

I claim:

In a brake testing apparatus adapted to be mounted in a vehicle runway, a rectangular outer frame adapted to be mounted flush with the surface of said runway, hangers depending from said outer frame, a first pair of longitudinally disposed channels mounted on said hangers, a second pair of longitudinally disposed channels facing said first pair of channels, rollers interposed between said channels, axles connecting each pair of said rollers, a rectangular inner frame mounted on said second pair of channels, a floor slab supported on said inner frame flush with the surface of said runway, a block on said outer frame having therein a longitudinally disposed cylinder located centrally of said outer frame, a body on said inner frame providing a longitudinally disposed plunger located centrally of said inner frame and adapted to work in said cylinder, means for resiliently resisting relative movement of said inner frame and said outer frame in one direction, and a pressure gage connected to said cylinder.

WALTER G. CAMPBELL.